United States Patent [19]

Garner et al.

[11] Patent Number: 5,014,193
[45] Date of Patent: May 7, 1991

[54] DYNAMICALLY CONFIGURABLE PORTABLE COMPUTER SYSTEM

[75] Inventors: Paul M. Garner, The Woodlands; Carrie Boone; Darren J. Cepulis, both of Houston, all of Tex.

[73] Assignee: Compaq Computer Corporation, Houston, Tex.

[21] Appl. No.: 258,148

[22] Filed: Oct. 14, 1988

[51] Int. Cl.[5] ............................................. G06F 11/00
[52] U.S. Cl. ................................... 364/200; 371/11.1
[58] Field of Search ................. 364/200, 900; 371/13, 371/12, 14, 66, 11.1

[56] References Cited

U.S. PATENT DOCUMENTS

| | | | |
|---|---|---|---|
| 4,334,307 | 6/1982 | Bourgeois et al. | 371/16 |
| 4,562,535 | 12/1985 | Vincent et al. | 264/200 |
| 4,575,714 | 3/1986 | Rummel | 340/568 |
| 4,589,063 | 5/1986 | Shah et al. | 364/200 |
| 4,602,369 | 7/1986 | Murakami et al. | 371/66 |
| 4,604,690 | 8/1986 | Crabtree et al. | 364/200 |
| 4,621,364 | 11/1986 | Tschoepe | 371/13 |
| 4,695,946 | 9/1987 | Andreasen et al. | 364/200 |
| 4,819,237 | 4/1989 | Hamilton et al. | 371/66 |

Primary Examiner—Michael R. Fleming
Assistant Examiner—Ayaz R. Sheikh
Attorney, Agent, or Firm—Pravel, Gambrell, Hewitt, Kimball & Krieger

[57] ABSTRACT

A dynamically configurable computer system which includes apparatus for storing former and sensed current system configuration data and for automatically reconfiguring the system without user interaction.

9 Claims, 11 Drawing Sheets

FIG. 1

| EDS | | ACTION REQUIRED | SEQUENCE |
|---|---|---|---|
| NEW | OLD | | |
| 00 | 00 | NO CHANGE | ONE |
| 00 | 01 | REMOVE EXT. DRIVE B | TWO |
| 00 | 10 | INVALID: TREAT AS 00 00 | ONE |
| 00 | 11 | REMOVE EXT. DRIVE AS A | FOUR |
| 01 | 00 | SET EXT. DRIVE AS DRIVE B | FIVE |
| 01 | 01 | NO CHANGE | ONE |
| 01 | 10 | INVALID: TREAT AS 01 00 | FIVE |
| 01 | 11 | SWITCH EXT. DRIVE FROM A TO B | SIX |
| 10 | 00 | INVALID: TREAT AS 00 00 | ONE |
| 10 | 01 | INVALID: TREAT AS 00 01 | TWO |
| 10 | 10 | NO CHANGE | ONE |
| 10 | 11 | INVALID: TREAT AS 00 11 | FOUR |
| 11 | 00 | SET EXTERNAL DRIVE AS A | SEVEN |
| 11 | 01 | SWITCH EXTERNAL FROM DRIVE B TO DRIVE A | EIGHT |
| 11 | 10 | INVALID: TREAT AS 11 00 | SEVEN |
| 11 | 11 | NO CHANGE | ONE |

SEQUENCE TABLE

DYNAMICALLY CONFIGURABLE PORTABLE COMPUTER SYSTEM

BACKGROUND OF THE INVENTION

1. Field of the Invention

The present invention relates to personal computers, and in particular to systems utilized in personal computers to initialize the personal computer system wherein one or more peripheral devices such as disk drives, modems, printers and the like are connected to the personal computer.

2. Description of Related Art

In the recent past personal computers have gained substantial popularity among individual users for business and home use. More recently, the portable personal computer has become increasingly popular. Portable personal computers are lightweight, small computers which users are able to conveniently transport while traveling to or from the office.

The typical portable computer has a built-in monitor or screen, a keyboard and a floppy disk drive in addition to resident random access and read only memories, a central processing unit and a number of input/output locations for connecting internal and external peripheral devices such as modems, printers, floppy disk drives and the like. These peripherals are utilized to enhance the performance of the portable computer at its most common point of use, such as the user's home or office and are not typically carried by the user with the unit when traveling. The user may have one set of peripheral devices at the office, a different set at home, and still other configurations at other locations such as the office of clients or acquaintances.

In the past, portable computer users were required to manually reconfigure the system each time a new environment of peripheral devices was encountered, including the situation where the the portable unit was being used in its self-contained configuration where no external peripherals were attached. Re-configuration typically involved setting switches or jumpers to indicate the presence or absence of external disk drives, whether such drives were lo be designated drive "A" or drive "B", whether a particular communication port was connected or not connected to a modem or serial printer, etc. Re-configuration also included execution of system initialization software or set up sequences to identify for the central processing unit the type or specification of disk drive which was connected as drive A or drive B and other system configuration data.

SUMMARY OF THE INVENTION

In contrast to such prior art systems, the dynamic configuration system of the present invention provides the portable computer with additional peripheral status or configuration storage registers and a novel software driven means for dynamically reconfiguring the system without user interaction. The system of the present invention includes means for determining the peripheral status and updating the configuration data to permit use of the computer to begin without executing a user prompted initialization sequence or requiring manual switches or jumpers to be reset each time the user changes environments.

The system includes a readable/writable memory device suitable for low power use, such as a CMOS memory circuit which stores data relating to peripheral configurations in a number of designated address locations or registers. The system of the present invention retains data relating to peripheral configuration including floppy disk drive type data when the system was last used utilized, automatically determines the current system configuration on power up, and updates appropriate data registers to reflect the current configuration status. By storing the data relating &o the last configuration status, the system is able to verify whether there has been a change, and if so update the configuration. If no change has occurred, the initialization sequence is by-passed and operation of the portable computer begins immediately. In this way, the user who typically alternates between two configurations, i.e. office and home, or office and self-contained while traveling will encounter little delay or inconvenience resulting from the changed configuration.

DESCRIPTION OF THE PREFERRED EMBODIMENT

Figure 1:
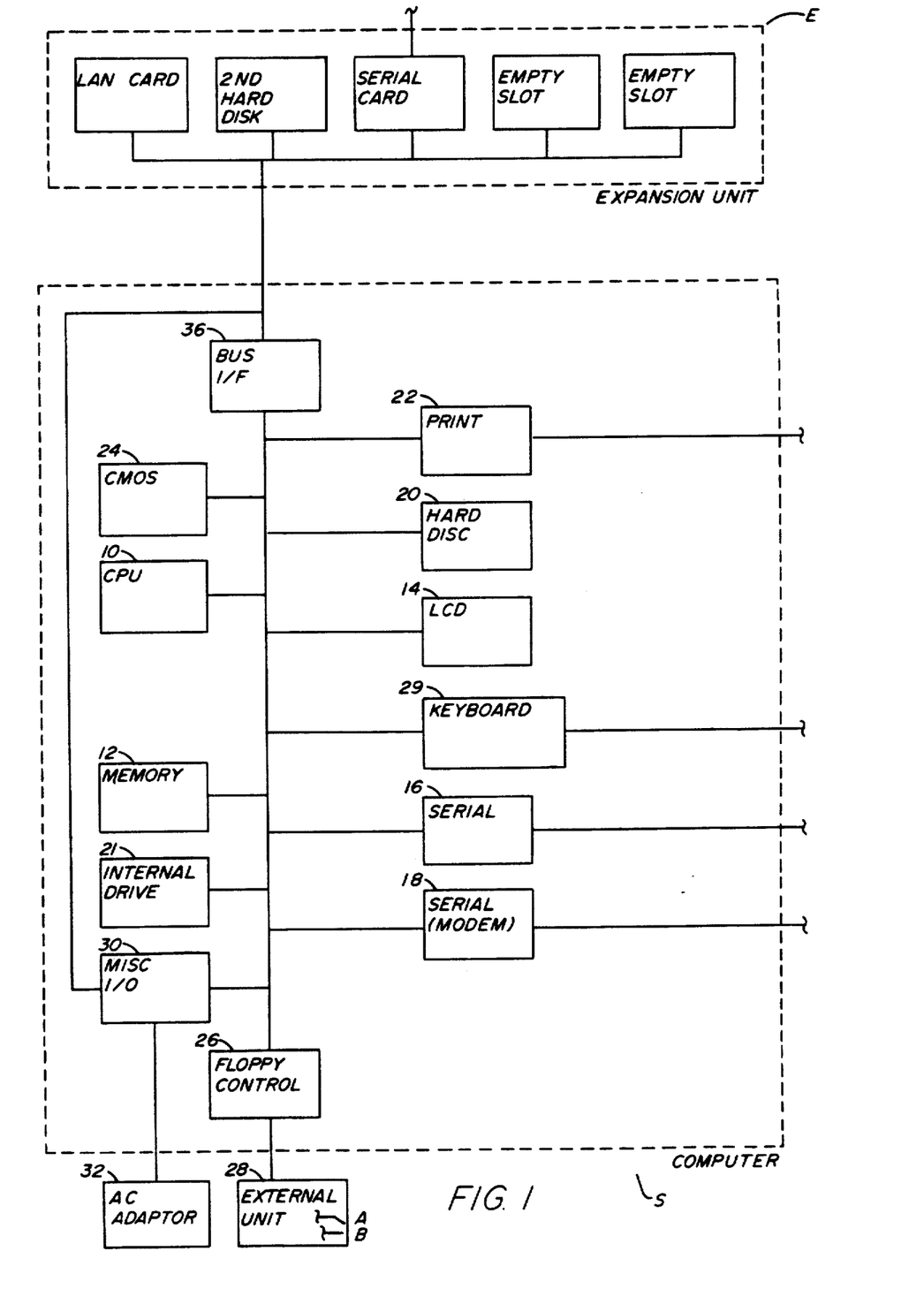
FIG. 1 is a schematic block diagram of a typical portable computer system.

The computer system of the present invention provides a means for configuring or changing the configuration of the system without the utilization of switches or jumpers, eliminating the need for the user to access internal system hardware and without the need to run a special configuration routine each time the configuration is changed. Referring now to FIG. 1, the letter S designates generally a typical personal computer system suitable for use with the present invention. Computer system S includes a central processing unit 10, a memory circuit 12 including system read only and random access memory circuits, a liquid crystal display 14, a serial communications port 16, a second serial communications port which generally includes the circuitry forming a modem 18, an internal fixed or hard disk memory device 20, an internal floppy disk drive 21, a printer port 22, a low power consumption readable, writable memory circuit 24, typically a complimentary metal oxide or CMOS device, an external expansion floppy-disk control logic circuit 26 for interaction with external floppy-disk drive unit 28, a keyboard and associated interface circuit 29 and a miscellaneous input/output device control logic circuit 30 for use with various external devices such as alternating current adapter 32.

In portable computer systems, power will be supplied by an internal battery pack (not shown) with the option to connect to alternating current voltage supply when available. The aforementioned elements are interconnected via internal bus 36. The system of the present invention is particularly well suited to interact via bus 36 with a system expansion unit E which would presumably remain at the office or home of the user and house a set of peripheral expansion devices such as a local area network circuit, a second fixed or hard disk drive, additional serial communication ports or additional random access memory circuits. The utilization of such an expansion unit does not form a part of the present invention and is therefore only referenced and described generally.

Briefly stated, the system of the present invention utilizes a number of novel instruction sequences stored with the system's power up initialization commands to control the initialization of the computer system S, determine peripheral configuration and make appropriate changes without user interaction. These instruction sequences cause the processor 10 to read the status of peripheral devices and system variables, store configuration data relating to changes detected and update the system configuration without user interaction. The system S includes in memory 12 various cable locations which store system peripheral device configuration values. On power up, the software of the present invention clocks in data to a drive status latch for each drive to reflect system status on power up. The status of these latches can only be modified during the initialization sequence and consequently do not react to changes in configuration made after initialization while the system is operating. In order to facilitate dynamic configurability, a number of readable/writable memory locations are also provided in CMOS circuit 24 to store system configuration data. On power up, the system software causes a polling of present conditions to be made and data relating to that status is stored in appropriate data registers in CMOS circuit 24. A comparison between the current data in these configuration registers to that in system memory tables relating to the system's prior configuration is made to determine if changes are necessary to the configuration status. If so, the changes are read from the current data registers in CMOS circuit 24 to the appropriate memory tables in internal memory 12.

The system memory registers include data relating to all initialized system configuration, including system speed, drive type data for drive A and drive B, internal expanded memory size, base memory size, peripheral device configuration, the assignment of communication ports and the status of devices attached thereto, the status of any attached fixed memory, etc. The present invention is concerned only with dynamically configuring the presence or absence of an external storage device, the designation of internal or external drives as drive A and drive B, and the assignment and status of the communication ports since these are the item most likely subject to change as the user transports the system from one location to another.

Six data bits at a prescribed address location in CMOS 24 are provided to store the data relating to the status of external storage device 28, such data reflecting whether the unit is connected, and if so whether it has been designated as drive A or drive B. In the preferred embodiment, the binary value of the first bit at this location designates whether the external drive is attached (1) or unattached (0). The binary value of the second bit designates whether the external drive is drive A (1) or drive B (0). The second bit is significant only if the first bit is set (1). These two bits are referred to as the external drive status or EDS register. The remaining four bits at this six bit location are provided to permit the processor 10 to save drive type data, which relates to the size and specification of a drive at one time connected to the system. In this specification this four bit register will be referred to as the CMOS Save register. The default condition in this six bit register is 000000, or external drive unattached and undesignated.

Also included in CMOS circuit 24 is a full eight bit drive type register divided into two nibbles, each nibble for storing current drive type data for drive A and drive B. This drive type register, as well as other registers in CMOS circuit 24, may be duplicated in system memory 12. When an external drive is disconnected, the drive type data is transferred to the CMOS save register where it can be retrieved when the drive is reconnected. When the system powers up, and it is determined that a change has been made to drive designation as A or B, or the status, i.e. connected or disconnected, of external drive has changed, the system of the present invention places the drive type data in the appropriate drive A or drive B nibble in the drive type register and updates the external drive status or EDS register.

An eight bit peripheral configuration register is provided in CMOS circuit 24 and in system memory to store information about the desired configuration for the system's peripheral devices. Included in this set of data are the status of the serial, modem, printer and external fixed disk devices. On power up, the system ROM will write the value of the corrected values for peripherals from the CMOS peripheral configuration register to the peripheral configuration table location in system memory including any changes, provided the changed status is valid. If the changed status is not valid, an error message is provided and the default conditions are written to the memory tables in system memory 12.

The value of the first bit in the peripheral configuration register designates the status of the serial and modem ports. A zero designates that communication port 1 is serial and that communication port 2 is for the modem. A one value designates that communication port 2 is the serial port and that communication port 1 is for the modem. The second bit of this register indicates the status of the serial port as off (0) or on (1). The third bit designates that status of the modem as off (0) or on (1). The fourth bit of this register stores data relating to interrupt request lines assigned to the serial and modem devices. A zero value in this bit indicates the serial port is assigned interrupt request three and the modem assigned interrupt request four. A one value reverses the interrupt assignment. The remaining four bits store data relating to the the internal fixed disk status and printer status and interrupt select. In the preferred embodiment only the first three bits of this register are dynamically configurable. The default status of the first three bits of this register is 010.

A two bit CMOS and corresponding system memory location is provided to store data relating to the modem configuration. This register will be referred to as the Modem Status register. The first bit of this register indicates whether the modem is not installed (0) or installed (1). The second bit indicates the modem's power up state as off (0) or on (1). The default condition is 00 indicating the modem is not installed and is off on power up.

Dynamic Configurability Sequences

Referring now to the drawings, the sequence of instructions utilized by computer system S to dynamically configure the external drive status and communication ports will be described in detail. These instructions are executed on system power up to poll the status of the external drive and communications ports, determine if they are valid, and if so, automatically make the indicated changes to the configuration registers in system memory 12.

Figure 3:
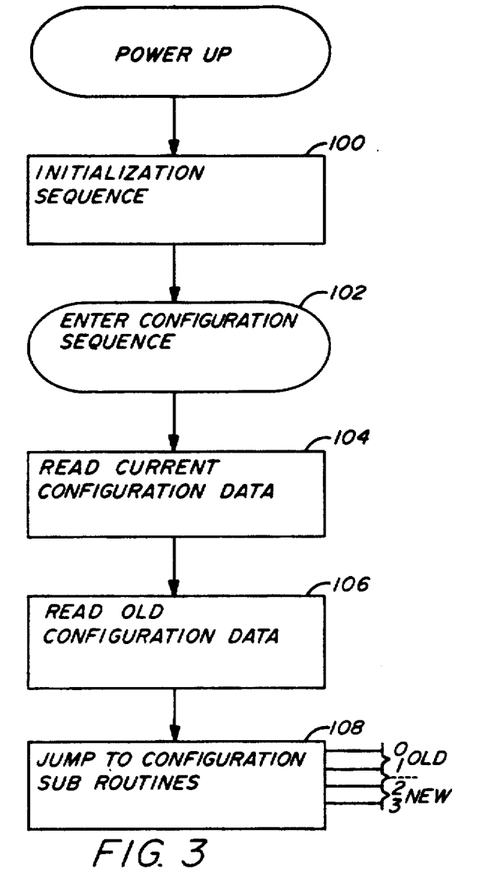
FIGS. 3, to 10, 11A, 11B, 12A, 12B and 13 are schematic block diagrams of logic sequences which form a part of the present invention.

Referring now to FIG. 3, on power up the system of the present invention causes an initialization sequence 100 to be executed. This sequence initializes system variables in accordance with prescribed system requirements to enable the dynamic configuration sequence to begin. This basic initialization sequence is unchanged from prior art and does not form a part of the present invention and will not be discussed in detail. It is sufficient to note that this basic sequence will be prescribed depending upon the particular computer system utilized and will be a matter known to those of ordinary skill in the art. Following this basic initialization, control of the processor is transferred to configuration sequence at step 102. Thereafter, control sequences 104 and 106 cause the processor to read current and old configuration data pertaining to external drives and communication ports. This reading is accomplished in the conventional manner by reading the status of external drive and communication port connectors for current data and reading data from the CMOS 24 for old or former configuration data.

With regard to external drive status, the current data is stored in a two bit register in a system input output memory location in accordance with the following criteria. The first bit will be set to one if an external drive is attached, and to zero if no external drive is found. The second bit, which indicates whether the external drive is designated drive A or drive B, will be set to one to indicate the external drive is designated drive A and zero to designate the external drive as drive B. The second bit is meaningless unless the first bit is set (1).

Figure 4:
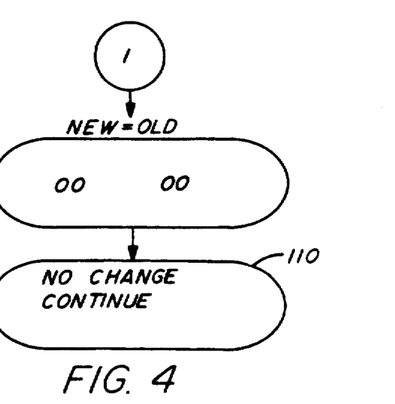
Figure 5:
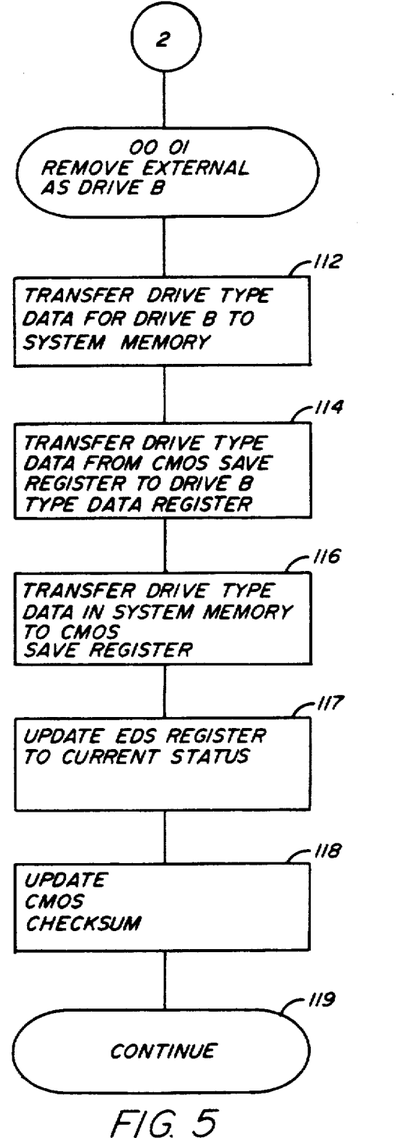

The former external drive status is stored in the EDS two bit register in CMOS circuit 24. The combination of the two bits relating to the current or new external drive status and the two bits relating to former external drive status form a four bit code which is utilized to cause control of the processor 10 to be transferred to one of eight logic subsequences in accordance with the sequence table shown in FIG. 2.

Where the new and old external drive status data are equal, such as 00 00 or 01 01, no changes have been sensed and control is transferred to subsequence 1 (FIG. 4). Subsequence 1 consequently merely executes a continue step 110 which returns control of the microprocessor to continue initialization with regard to other systems such as the communication ports which will be described below since no changes to external drive status are required.

Where the new and old status bits are equal to 00 01, a valid situation is represented where former attached external drive designated drive B (01) has been removed (00). This status causes control of the processor to be transferred to subsequence 2 shown in FIG. 5. Subsequence 2 begins execution at step 112 which causes the processor to transfer the drive type data regarding former drive B to system memory for future use. Control is then transferred to step 114 which causes the processor to transfer drive type data from the CMOS save register to the drive type data register for drive B. Thereafter control transfers to step 116 which causes the processor to transfer the drive type data in system memory to the CMOS save register. Thereafter control transfers to step 117 which updates the EDS register to 00 which represents the current external drive status. Control is then transferred to step 118 which updates the CMOS checksum variable to reflect configuration changes. Control is then transferred to continue step 119 for further initialization.

Figure 2:
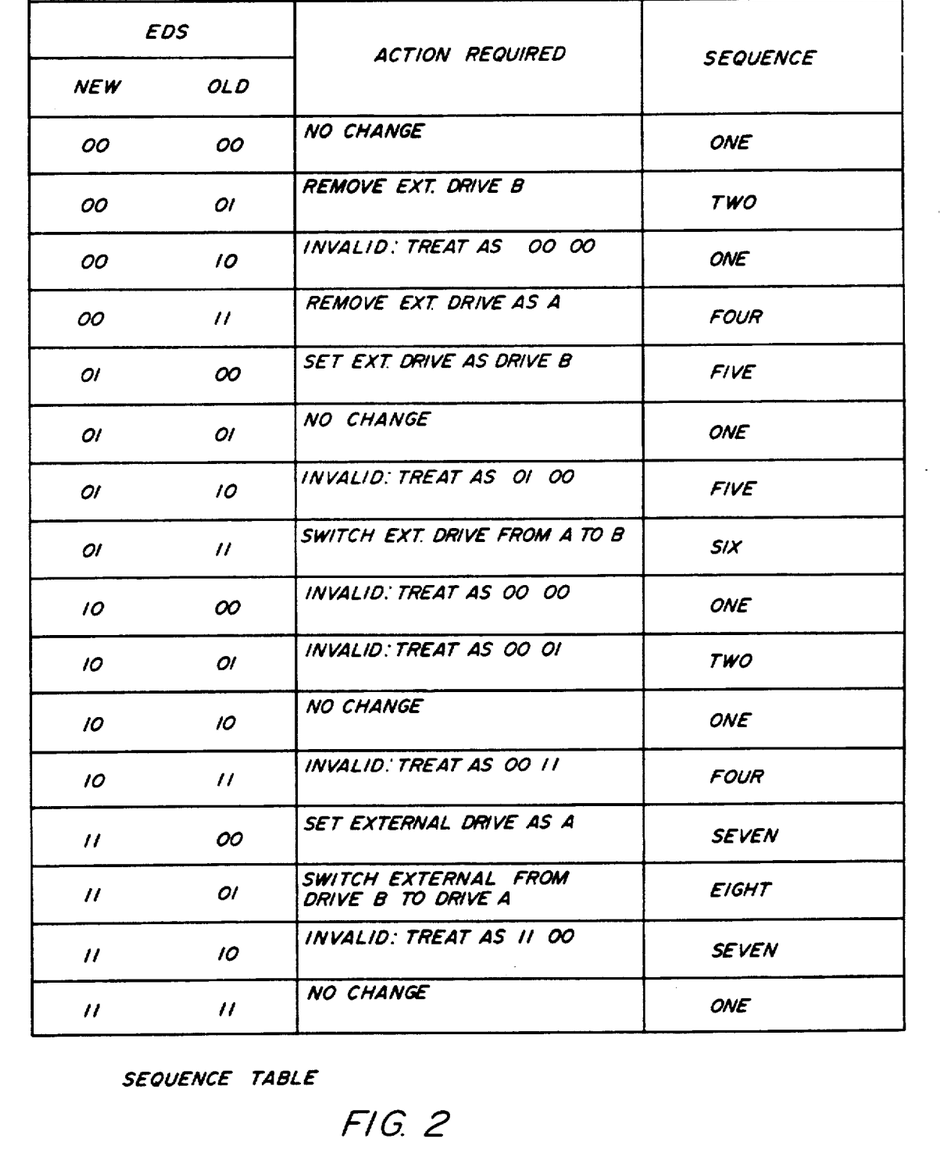
FIG. 2 is a table which sets forth which logic sequence is executed based upon determined present system configuration status.

Whenever the external drive status bits indicate an invalid configuration, the system of the present invention treats the invalid configuration status as the equivalent of one of the valid configurations and executes the appropriate subsequence. These invalid configurations and the manner in which they are dealt with (FIG. 2) are as follows:

| INVALID | TREAT AS |
| --- | --- |
| 00 10 | 00 00 |
| 01 10 | 01 00 |
| 10 00 | 00 00 |
| 10 01 | 00 01 |
| 10 11 | 00 11 |
| 11 10 | 11 00. |

Figure 6:
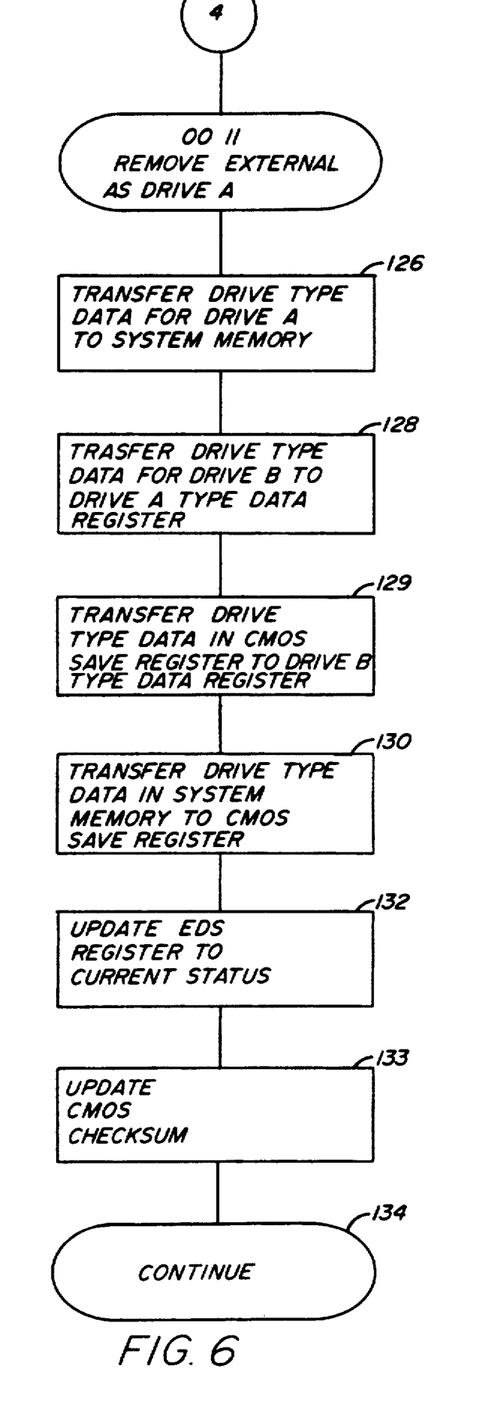

The first, second and sixth conditions indicate the former external drive status was unattached and designated drive A which is an invalid condition no matter what the new status indicates and represents a system configuration error and possible error in the CMOS 24. The 10 condition is invalid because the circuitry of the computer is such that when operating normally when the external drive is not attached, the A or B select bit for the external drive is set to the B state. Thus in these situations, the present invention ignores the former status of unattached, drive A or 10 and assumes the former status was unattached, drive B or 00. Likewise, the third, fourth and fifth conditions indicate a possible error in the status sensing circuitry since each indicates an unattached, designated drive A new status. The system of the present invention treats each of these 10 present status conditions as 00 conditions so that the system will complete system initialization. In each of these invalid configuration conditions, the system treats the situation as one of the valid configurations as set forth in the table of FIG. 2.

Where the four bit external drive status data is 00 11, the new configuration is external drive unattached, designated drive B, and the old configuration was external drive attached, designated drive A. This is a valid configuration change which requires drive A to be removed as the external drive and substitute drive A as the internal drive. In this circumstance, control is transferred from step 108 to subsequence 4 (FIG. 6).

Figure 7:
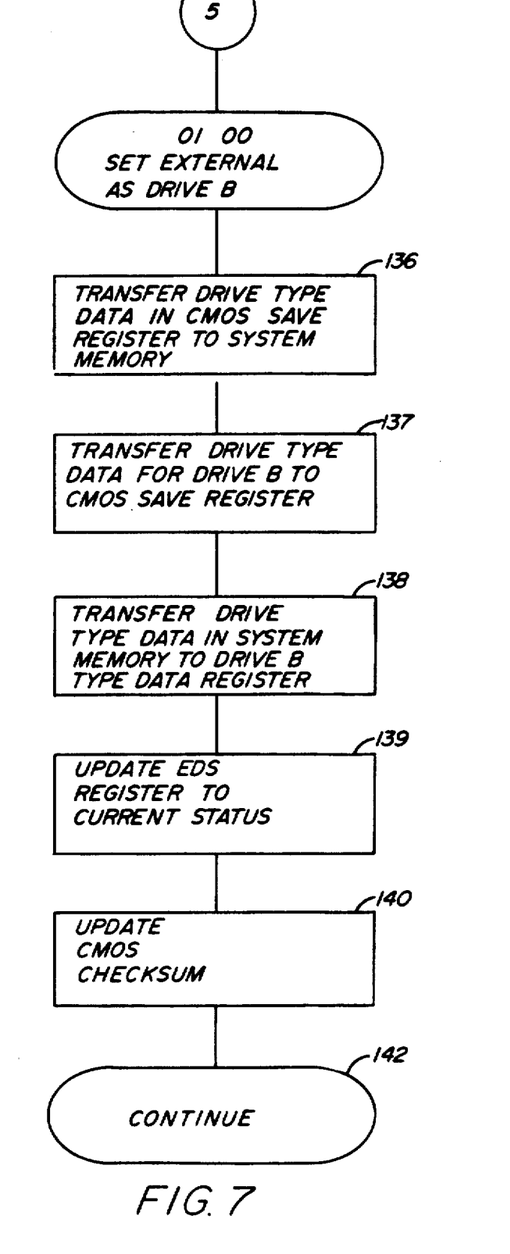
Figure 8:
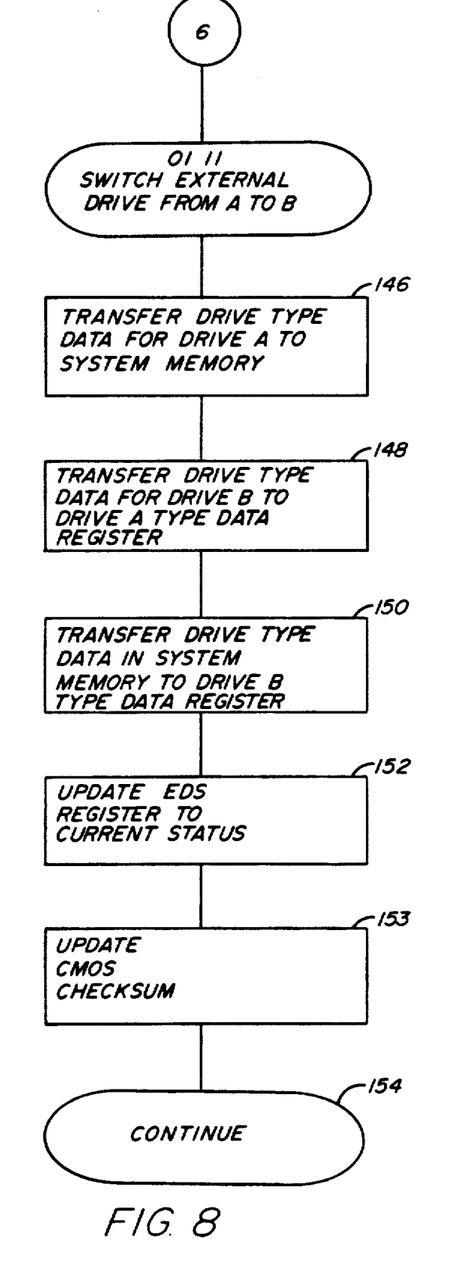

Subsequence 4 begins execution at step 126 which causes the drive type data for drive A (the former external drive) to be transferred to internal system memory. Step 128 thereafter causes the processor to transfer the drive B type data (the former internal drive) to the drive A type data register to prevent an invalid condition from arising. Control is transferred to step 129 which causes the processor to transfer drive type data in the CMOS save register to the drive B type data register and transfers control to step 130. Step 130 causes the processor to transfer drive type data in system memory to the CMOS save register. Control then transfers to step 132 which causes the EDS register to be updated to the current status. Control is thereafter transferred to step 133 which updates the CMOS checksum value. Thereafter, control is returned to subsequent initialization sequences via continue step 134.

Where the external drive status bits comprise 01 00, the indication is that the configuration has changed so that an external drive, drive B, has been attached whereas the old configuration was external drive unattached. This represents a valid configuration change which causes control of processor 10 to be transferred from step 108 to subsequence 5 shown in FIG. 7. Subsequence 5 begins execution at step 136 which causes the processor to transfer drive type data from the CMOS save register to a system memory register. Control proceeds to step 137 which causes the processor to transfer drive type data for drive B to the CMOS save register. Step 138 causes the processor to transfer the drive type data in system memory to the drive B type data register. Thereafter, step 139 updates the EDS register to current status. Control transfers to step 140 which updates the CMOS checksum value. Control then transfers to continue step 142 for further initialization.

Where the external drive status bits comprise 01 11, a valid configuration change of an attached external drive from drive A to drive B is indicated. This status code causes control to be transferred from step 108 to subsequence 6 (FIG. 8). This situation can occur if the user goes from a first peripheral system at the office wherein the external drive was designated drive A to the home or other system where the external drive is attached but designated drive B or if the user changes the setting of the A/B switch on his external drive. The system of the present invention initially assumes the external drive will be of the same type and merely transfers the drive type data from one register to the other. If this assumption is incorrect, other portions of the basic system software will generate a setup error message and request the user to run the system setup program.

Figure 9:
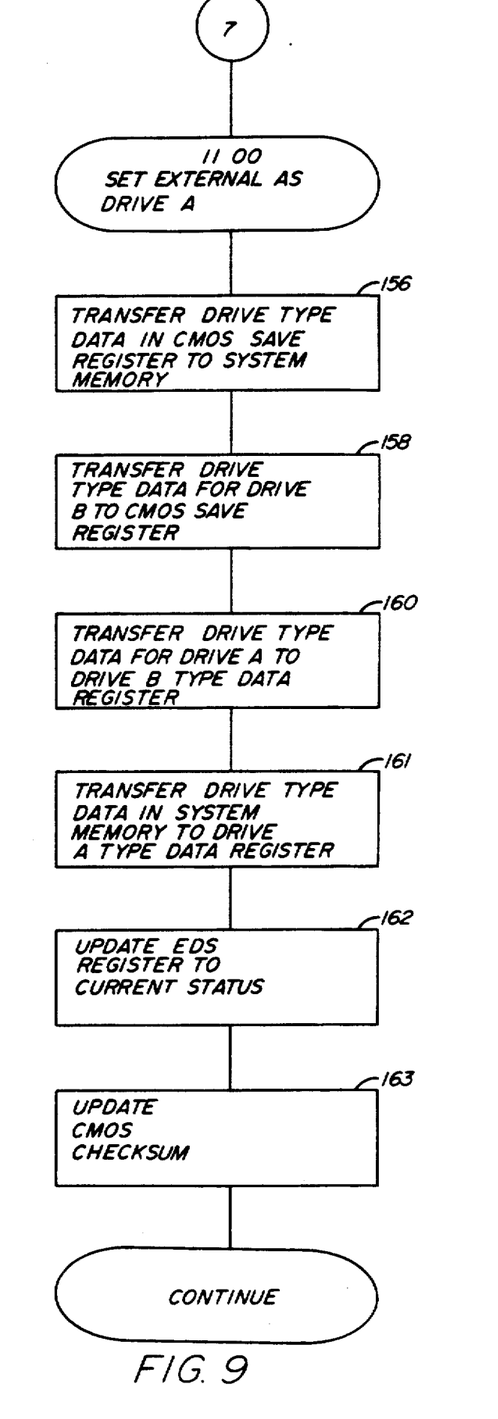
Figure 10:
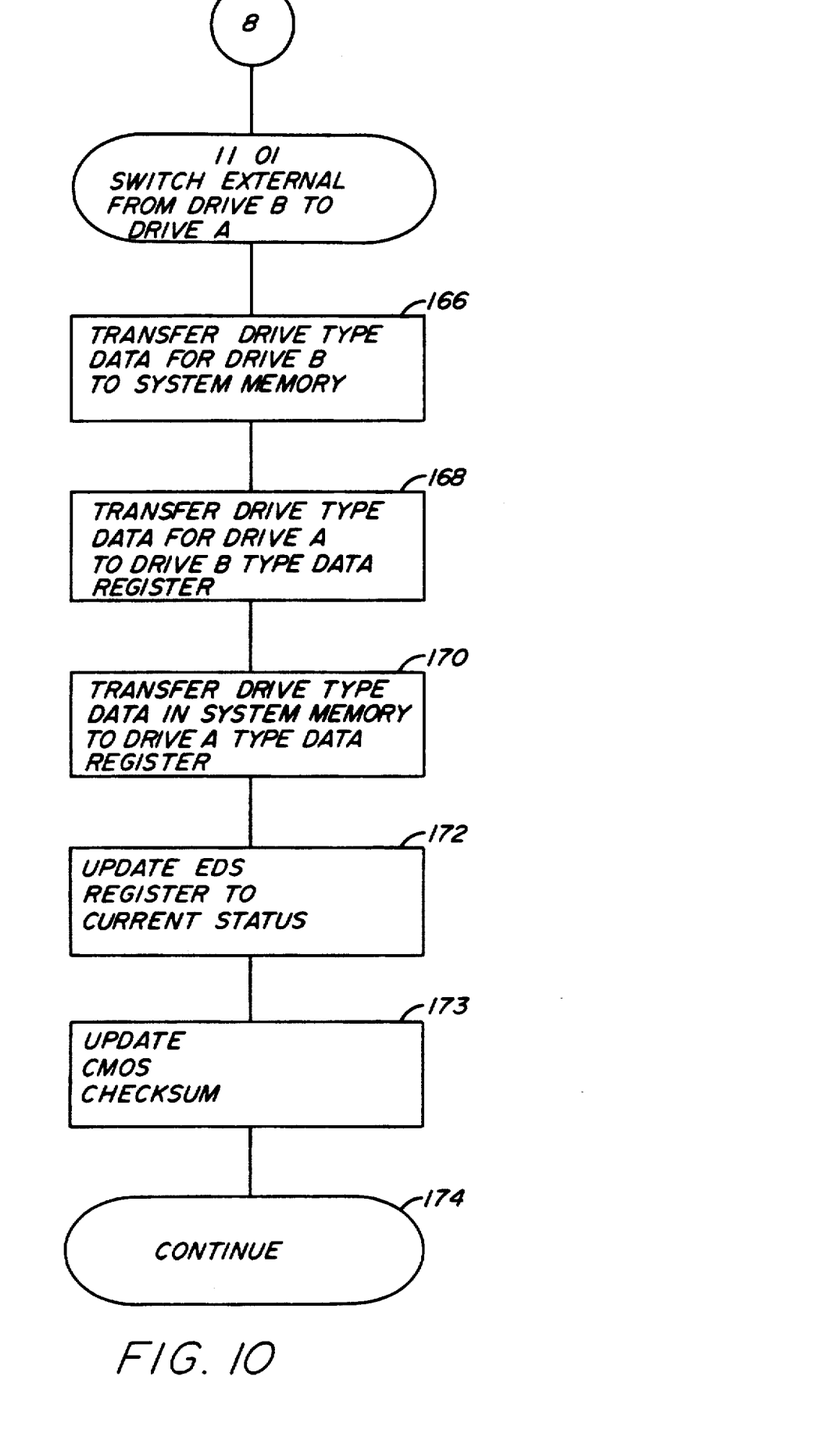

Subsequence 6 begins execution at step 146 which causes the processor to transfer the drive type data for drive A temporarily to an internal memory location. Step 148 then causes the processor to transfer the drive type data for drive B to the drive type data register for drive A. The saved data for former drive A is then transferred at step 150 from the internal memory location to the drive type data register for drive B. Step 152 updates the EDS register to current status and step 153 updates the CMOS checksum value and returns control for further initialization via continue step 154.

Where the external drive status bits comprise 11 00 a valid configuration change from no external drive to external drive attached as drive A is indicated. In this circumstance, control is transferred from step 108 to subsequence 7 (FIG. 9). Subsequence 7 begins execution at step 156 which causes the processor to transfer the drive type data of the CMOS save register temporarily to an internal memory location. register for drive B. Step 158 then causes the processor to transfer the drive type data for drive B to the CMOS save register. Step 160 causes the processor to transfer the drive type data for drive A to the drive type data register for drive B. Step 161 then causes the saved data in internal system memory to be transferred to the drive A type data register. It then transfers control to step 162 which updates the EDS register to the current status. Step 163 updates the CMOS checksum value and control is transferred for further initialization via continue step 164.

Where the external drive status bits comprise 11 01, a valid configuration change from an attached external drive designated B to drive A as indicated. In this situation, control is transferred from step 108 to subsequence 8 (FIG. 10). Subsequence 8 begins execution at step 166 which causes the processor to transfer the drive B type data temporarily to an internal memory location. Thereafter, step 168 causes the processor to transfer the drive A type data to the drive B type data register, and step 170 transfers the temporarily saved drive A type data to the drive B type data register from internal memory. Control is thereafter transferred to step 172 which causes the EDS register to be updated. Step 173 updates the CMOS checksum value, followed by continue step 174 which returns control for further initialization. In this situation, the system of the present invention initially assumes the drive type data for the external drive will be the same, and if not, the basic system software will generate an error message requiring set up values for the external drive to be provided by the user.

Thus subsequences 1 through 8 automatically respond to changes in external drive configuration which are likely to occur in portable computer applications. In most circumstances these changes are recognized and reconfigured as the external drive present conditions without utilizing switches or jumpers, and in most cases the requirement that the basic setup program be rerun is avoided.

Communications Port Configuration Sequence

Figure 11A:
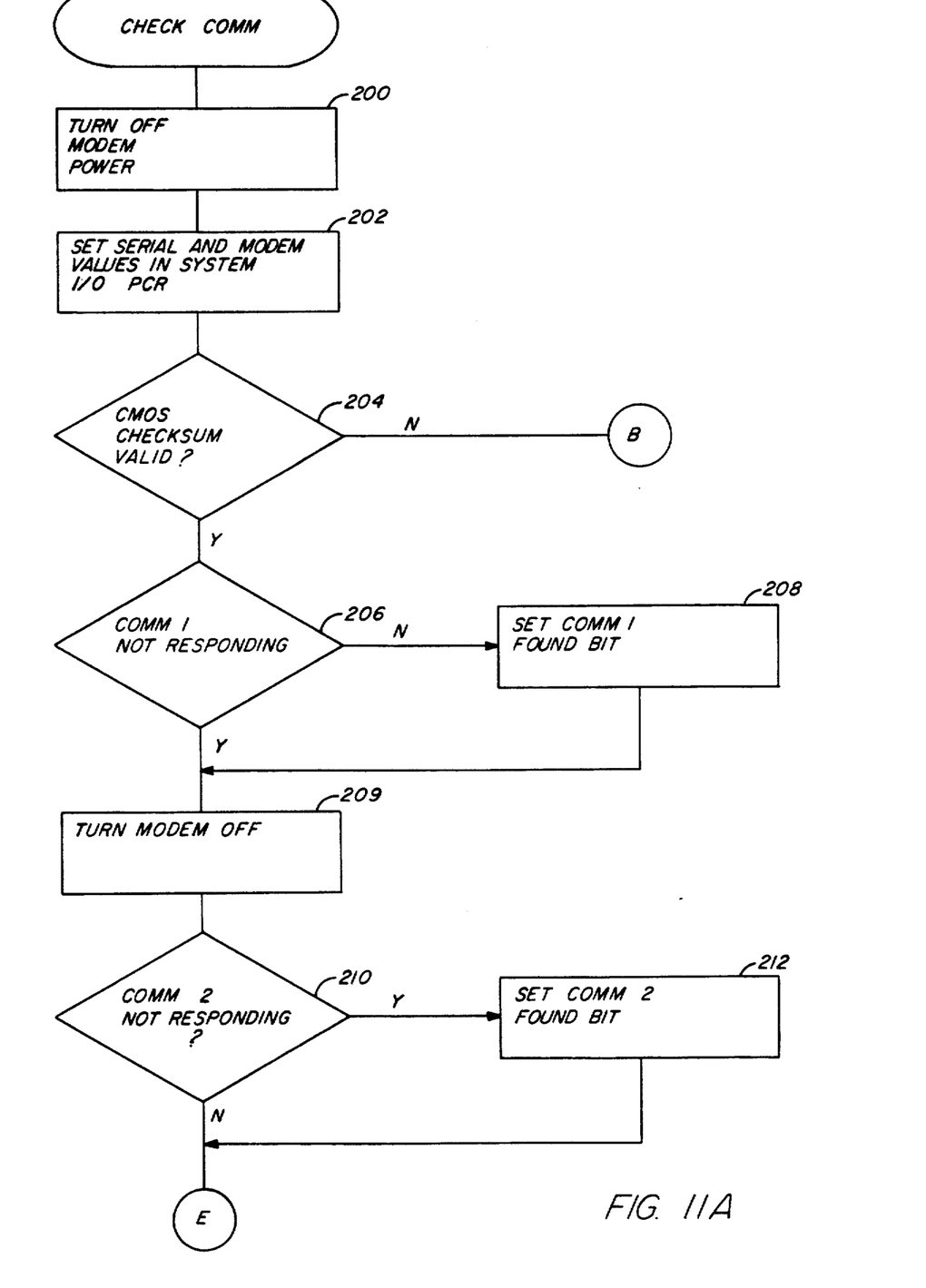
Figure 11B:
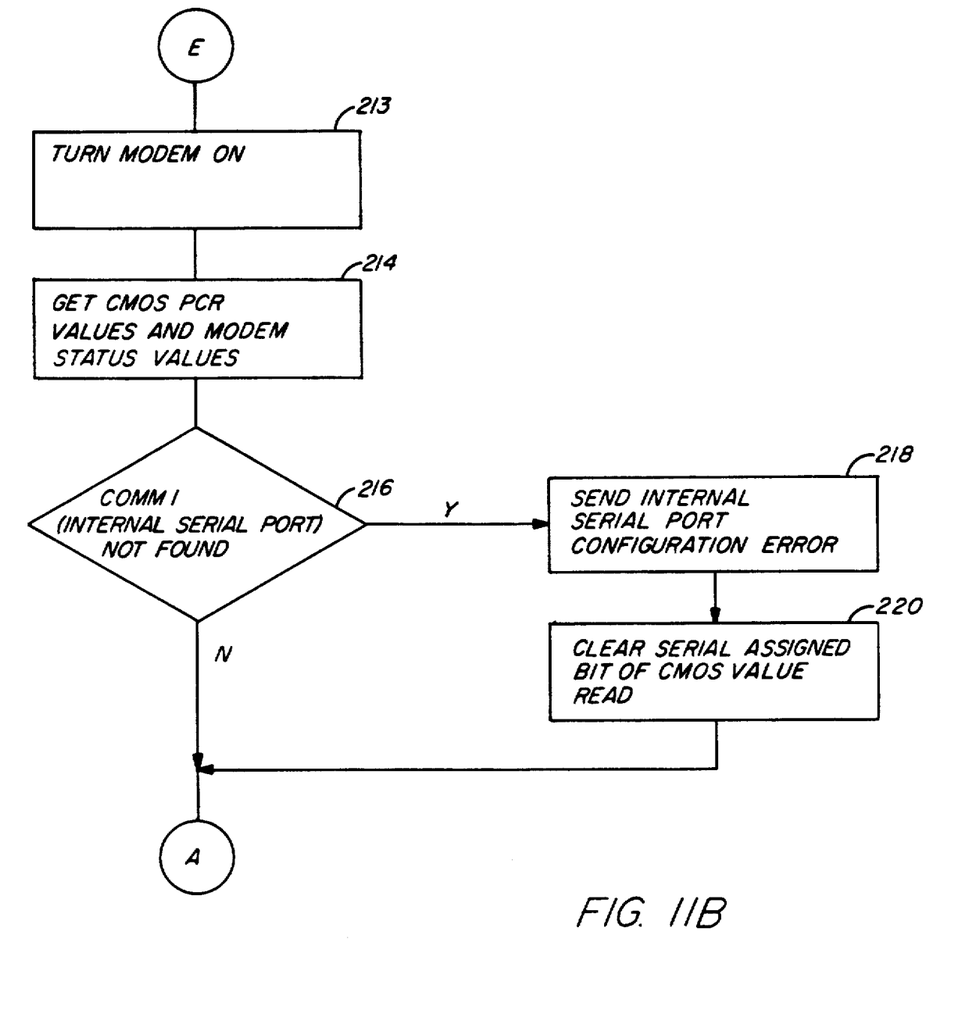

The system of the present invention provides a sequence of instructions which are executed each time the system is powered up which cause the processor to determine the communication port status, determine if it is valid, and if so, update the peripheral configuration register to reflect current values. If the current configuration is not valid, a configuration error is reported and default values are written to the peripheral configuration register. This sequence of steps begins with sequence CHECK-COMM (FIGS. 11A and 11B).

Sequence CHECK-COMM begins execution at step 200 which causes the processor to issue an instruction to turn off the power to the modem by setting a power off flag in an appropriate register. Once all configuration status checks are completed the modem will be activated if attached and designated power on at power up status.

Control is thereafter transferred to step 202, which causes the processor to set the values for the serial and modem ports in the System Peripheral Configuration Register (PCR) maintained at a prescribed input/output address location to expected values. These initialization values are that the internal serial port is assigned as communications line one and interrupt request line three, and the internal modem port is assigned as communications line two and interrupt request line four. This assignment is accomplished by setting the first bit in the system PCR to a zero value, the second bit to one (serial attached), the third bit to one (modem attached), and the fourth bit to zero (interrupt request line designations). Control is thereafter transferred to step 204.

Step 204 causes the processor to execute a validity checksum test as to all of the CMOS values before proceeding with initialization. If the checksum is valid, control is transferred to step 206 for further initialization. Step 206 causes the processor to determine if the internal serial port responds on communications line one in any conventional manner, such as by writing to the port and reading the status. If the internal serial port responds, control is transferred to step 208 which causes the processor to set a COMM 1 bit in a register designated FOUND to indicate the internal serial port is responding on communications line one and return. If no peripheral responds on communications line one, control transfers from step 206 to step 209 directly.

Step 209 turns the modem power off. Steps 210 and 212 cause the processor lo determine if a a modem or second serial port responds on communications line two and set a COMM 2 bit in the FOUND register if attached, and return to step 213. Step 213 reactivates the modem power. If no response is received on communications line two, control is transferred from step 210 to step 213 directly.

Step 214 causes the processor to read the values in the CMOS Peripheral Configuration Register (CMOS PCR) and the Modem Status Register also in CMOS circuit 24 and write them to a temporary memory location, where present and prescribed configuration values will be compared. The CMOS PCR will include data indicating the last status of communication line and status assignment for the serial and modem ports. Control is then transferred to step 216 which determines if a peripheral is responding on to the communication line designated for the internal serial port by reading the appropriate bit in the FOUND register. If not, control is transferred to steps 218 and 220 which cause the processor to issue an internal serial port configuration error message, and to clear the serial assignment bit in the CMOS PCR values read into memory. Control then transfers to step 222. If, at step 216 it was determined that a peripheral is attached to the serial port, control transferred directly from step 216 to step 222.

Figure 12A:
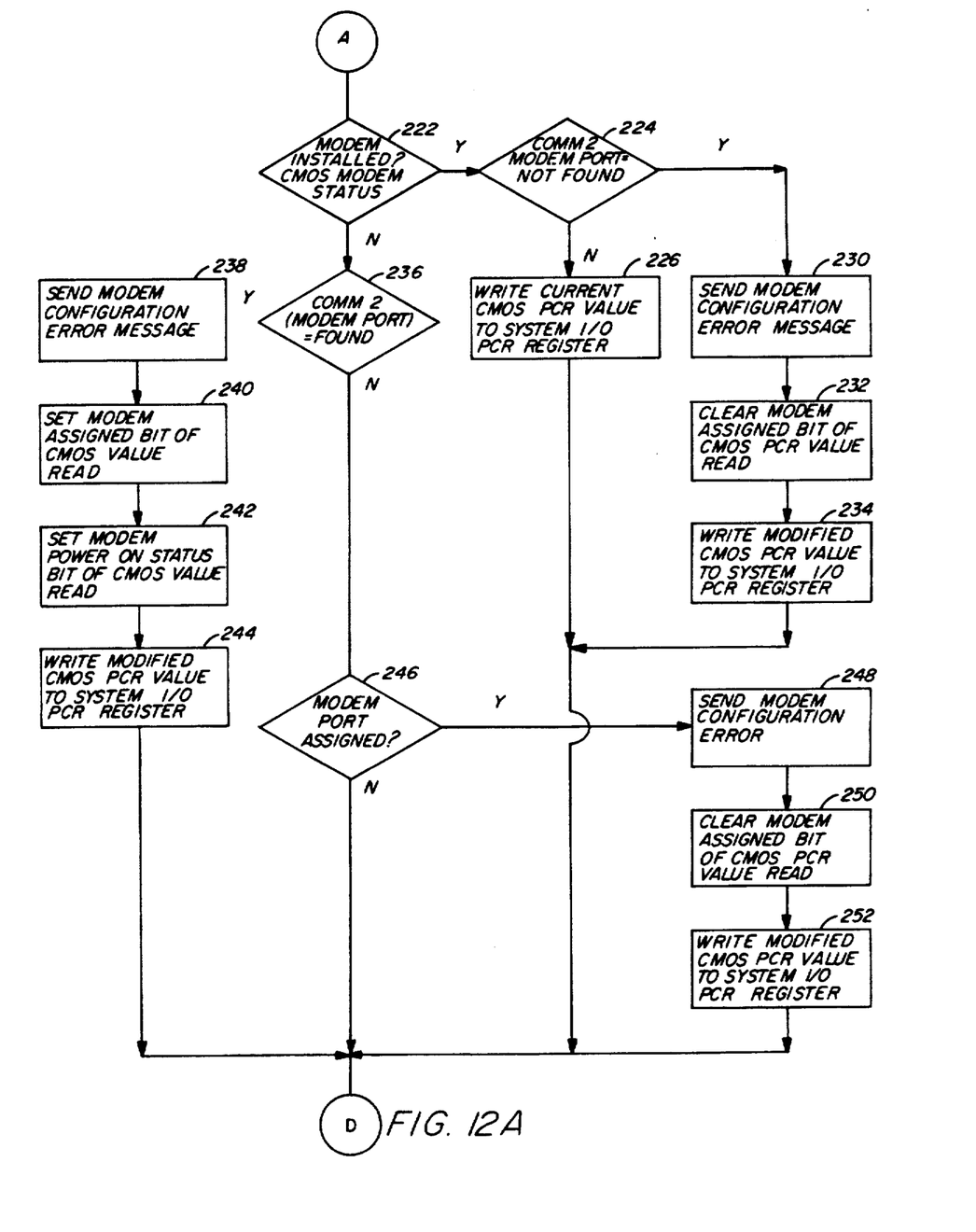
Figure 12B:
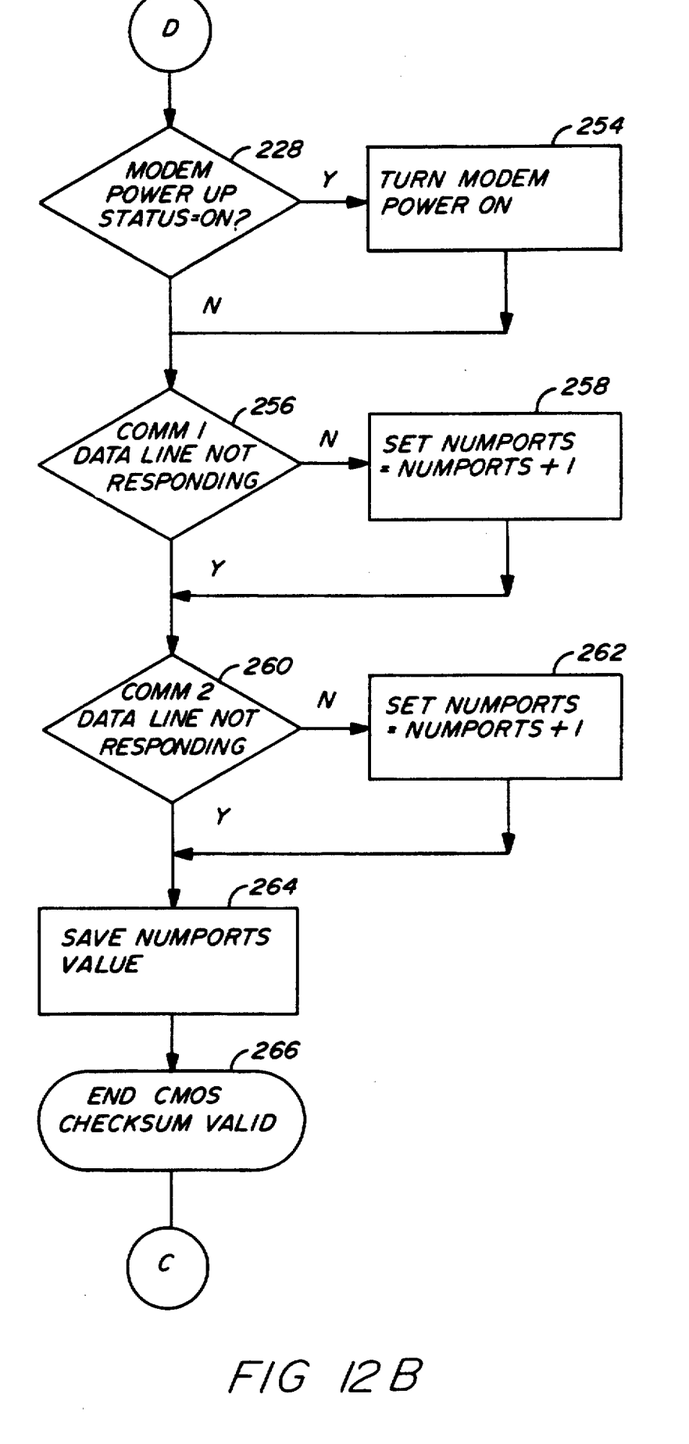

Referring now to FIGS. 12A and 12B, execution of CHECK-COMM resumes at step 222 which causes the processor to determine the modem status by reading the first bit of the CMOS Modem Status Register, which will be a one indicating the last status is installed and a zero if not installed. If the status is installed, control is transferred from step 222 to step 224, which causes the processor to read the appropriate bit in the FOUND register to determine whether a peripheral is attached to the modem port. If a peripheral is attached, control is transferred to step 226 which causes the processor to write the current CMOS PCR value to the system PCR register (the system is configured in accordance with present CMOS PCR register values). Control is then transferred to step 228 for further initialization.

If at step 224, it is determined that no peripheral is attached to the modem port, control is transferred to steps 230, 232 and 234, which cause the processor to issue a modem configuration error message, clear the modem assigned bit of the CMOS PCR value read to memory and write the modified value to the system PCR register. These steps thus update the system PCR register to the currently sensed configuration and then transfer control to step 228.

If at step 222 the processor determined that the CMOS modem status was not installed, control was transferred to step 236 which causes the processor to read the appropriate bit from the FOUND register to determine if a peripheral is responding on the modem port. If yes, a peripheral configuration error is issued at step 238, the modem status assigned bit is set (modem assigned) in the CMOS PCR value read to memory at step 240, the modem power up status bit is set to one (power on) at step 242 and the modified CMOS PCR value read to memory is written to the system PCR register at step 244. These steps update the system PCR register to currently sensed conditions. Control is then transferred to step 228 for further initialization.

If at step 236, the processor determines that no peripheral was attached to the modem port in accordance with present CMOS PCR values, control is transferred to step 246. Step 246 causes the processor to determine whether the current CMOS modem status bit is assigned. If not, current configuration is correct and control is transferred to step 228.

If at step 246 it is determined that the modem status bit in the current CMOS PCR value is assigned (set to one) but no peripheral is attached, control is transferred to steps 248, 250 and 252. These steps cause the processor to issue a modem configuration error message, clear the assigned bit in the CMOS PCR values read lo memory and write the modified CMOS PCR values to the system PCR register thereby updating this register to currently sensed values. Control is then transferred to step 228 for further initialization.

Step 228 causes the processor to read the modem status power up bit to determine if the modem should be activated on power up. If so, control is transferred to step 254 which causes an appropriate power on bit to be set which in turn will activate the modem. Control returns to step 256.

Steps 256, 258, 260, 262 and 264 cause the processor to determine the number of communications ports active and save this value for future reference. The CHECKSUM valid sequence ends at step 266.

Figure 13:
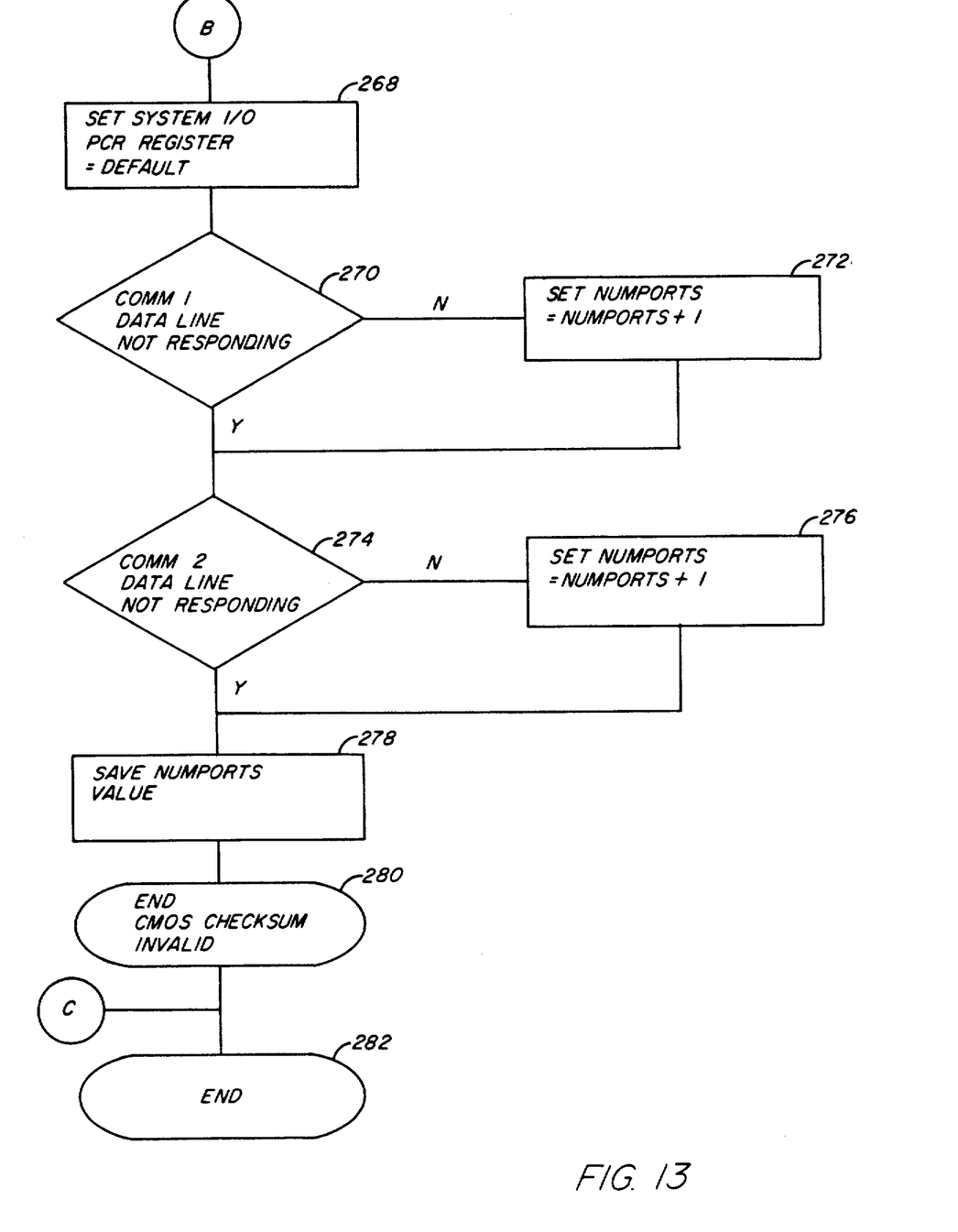

Referring now back to FIG. 11A, if at step 204 the CMOS data checksum was invalid, general system configuration data is erroneous and control is transferred to step 268 (FIG. 13). This step causes the processor to set the system PCR values to default values which are prescribed for the system. Thereafter steps 270, 272, 274, 276 and 278 cause the processor to determine the number of active communications ports available and save this value as NUMPORTS variable for future use. Control transfers to step 280 which ends the checksum invalid sequence and the CHECKCOMM sequence ends at step 282.

Thus, if the CMOS PCR data is valid, CHECK-COMM sequence causes the system to initialize the peripheral configuration values of the communications ports to expected assigned attached configuration, determine present configuration, modify or update system PCR values to actual present conditions, issue error messages where erroneous configuration conditions arise and initialize the communications ports automatically even though configuration has been changed. Where the CMOS PCR data is invalid configuration is set at default values.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. In a computer system including a processor, system memory, a housing, provisions for connecting one or more peripheral devices such as disk drives, serial printers, or modems into the computer system internal or external to the housing and peripheral status data storage means for storing data relating to any connected peripheral devices, a dynamic configuration means for automatically initializing system peripheral configuration data on system power-up, said dynamic configuration means comprising:

(a) system configuration status means for storing data indicative of internal and external peripheral device status;

(b) former status means for storing data indicative of the status of internal and external peripheral devices when the system was last used;

(c) current status means for determining the current status of internal and external peripheral devices and developing data indicative thereof;

(d) means coupled to said former status means and said current status means for determining differences between said data of said former status means and said current status means; and (e) means coupled to said difference determining means and said system configuration status means for automatically updating said data stored in said system configuration status means based upon said determined differences between said former status data and said current status data.

2. The computer system of claim 1, wherein the computer system includes a memory drive internal to the housing and provisions for the connection of a memory drive external to the housing as a peripheral device, and wherein said former status means includes means for storing drive status data indicative of the status of said internal memory drive and drive status data indicative of the status of said external memory drive.

3. The computer system of claim 2, wherein said former status means includes means for storing data indicative of the internal and external drive type, whether the internal drive was designated drive A or drive B, whether the external drive was attached and whether the external drive was designated drive A or drive B.

4. The computer system of claim 2, wherein said dynamic configuration means further comprises:

means coupled to said current status means for determining whether said current status data corresponds to a valid system configuration so as to permit operation of the computer system; and means coupled to said current status means for issuing a configuration error message if said current system status corresponds to an invalid system configuration.

5. The computer system of claim 4, further comprising:

means coupled to said system configuration means for entering valid default configuration data to said system configuration status means if said current status data corresponds to an invalid system configuration.

6. The computer system of claim 1, wherein:

the computer system includes means for connecting a plurality of peripheral communication devices such as printers or modems;

said former status means includes means for storing data indicative of a former assignment of each of said connecting means to a peripheral communication device and a former communication format of each of the connected peripheral communication devices; and said current status means includes means for determining the current connection of said communication peripheral devices to each of said connecting means and the current communications format requirement of each of the connected peripheral communication devices.

7. The computer system of claim 6, wherein said former status means and current status includes means for storing data indicative of whether each of said communications peripheral devices should be activated upon system activation; and means for automatically activating those peripheral communications devices so designated upon system activation.

8. The computer system of claim 6, wherein said dynamic configuration means further comprises:

means coupled to said current status means for determining whether said current status data corresponds to a valid system configuration so as to permit operation of the system; and means coupled to said current status means for issuing a configuration error message if said current status data corresponds to an invalid system configuration.

9. The computer system of claim 8, further comprising:

means for entering valid default configuration data to said system configuration status means if the determined current status is invalid.

* * * * *